United States Patent [19]

Ando et al.

[11] Patent Number: 4,933,879

[45] Date of Patent: Jun. 12, 1990

[54] MULTI-PLANE VIDEO RAM

[75] Inventors: Hisashige Ando, Yokohama; Saburo Sasanuma; Takahiro Sakuraba, both of Kawasaki, all of Japan

[73] Assignee: Fujitsu Limited, Kawasaki, Japan

[21] Appl. No.: 157,231

[22] Filed: Feb. 18, 1988

[30] Foreign Application Priority Data

Feb. 20, 1987 [JP] Japan ................................ 62-035663

[51] Int. Cl.[5] ................................................ G06F 15/62

[52] U.S. Cl. .................................... 364/522; 340/703; 340/799; 364/521

[58] Field of Search ................................ 364/518–522; 340/747, 750, 798–800, 744, 703; 365/230

[56] References Cited

U.S. PATENT DOCUMENTS

| | | | |
|---|---|---|---|
| 4,628,467 | 12/1986 | Nishi et al. | 364/521 |
| 4,823,119 | 4/1989 | Ishii | 340/744 X |
| 4,823,281 | 4/1989 | Evangelisti et al. | 340/747 X |

FOREIGN PATENT DOCUMENTS

| | | |
|---|---|---|
| 0073486 | 3/1983 | European Pat. Off. . |
| 0107010 | 9/1983 | European Pat. Off. . |

*Primary Examiner*—Gary V. Harkcom
*Assistant Examiner*—H. R. Herndon
*Attorney, Agent, or Firm*—Staas & Halsey

[57] ABSTRACT

A multi-plane video RAM for displaying a color image on a display apparatus. A multi-plane bit operation unit is used for calculating input data from an external stage based on a predetermined rule corresponding to an information applied from the external stage. Memory arrays are operatively connected to the multi-plane bit operation unit for writing resultant data calculated by the multi-plane bit operation unit. Each array having three-dimensionally arranged k sets of memory planes each consisting of m (rows)×n (columns); wherein the same corresponding positions of the k sets of memory planes are simultaneously accessed and the resultant data calculated by the multi-plane bit operation unit are also simultaneously written thereto.

4 Claims, 11 Drawing Sheets

*Fig. 11*

4R

| | |
|---|---|
| 0 0 0 0 | "0" |
| 0 0 0 1 | $\overline{D \text{ or } S}$ |
| 0 0 1 0 | $\overline{D}$ AND S |
| 0 0 1 1 | $\overline{D}$ |
| 0 1 0 0 | D AND $\overline{S}$ |
| 0 1 0 1 | $\overline{S}$ |
| 0 1 1 0 | D EOR S |
| 0 1 1 1 | $\overline{D \text{ AND } S}$ |
| 1 0 0 0 | D AND S |
| 1 0 0 1 | $\overline{D \text{ EOR } S}$ |
| 1 0 1 0 | S |
| 1 0 1 1 | $\overline{D}$ or S |
| 1 1 0 0 | D |
| 1 1 0 1 | D or $\overline{S}$ |
| 1 1 1 0 | D or S |
| 1 1 1 1 | "1" |

D: DESTINATION DATA

S: SOURCE DATA

MULTI-PLANE VIDEO RAM

BACKGROUND OF THE INVENTION

1. Field of the Invention

The present invention relates to a multi-plane video random access memory (multi-plane video RAM), more particularly it relates to the structure of the multi-plane video RAM for displaying various color images on a display apparatus.

2. Description of the Related Art

Conventionally, a video RAM is widely used in the field of the image processing and has a two dimensional structure consisting of a plane having X-Y directions. In this case, when displaying a color image on a display apparatus, it is necessary of form a three dimensional structure by adding a color element. That is, the third dimension having the color element is used for determining the color and intensity thereof. In general, the multi-plane video RAM for displaying a color image is provided in parallel in order to form a three dimensional structure. Such a structure, however, becomes very complex and the manufacturing cost is high. The problems of the structure of the conventional video RAM wil be explained hereinafter.

SUMMARY OF THE INVENTION

An object of the present invention is to provide a multi-plane video RAM having an improved three dimensional structure and to enable three dimensional access to memory arrays comprising the multi-plane video RAM.

In accordance with the present invention, there is provided a multi-plane video RAM for displaying a color image on a display apparatus, including: a multi-plane bit operation unit for calculating an input data from an external stage based on a predetermined rule corresponding to information applied from the external stage; and memory arrays operatively connected to the multi-plane bit operation unit for writing resultant data calculated by the multi-plane bit operation unit, and each having three-dimensionally arranged k sets of memory planes each consisting of m (rows)×n (columns); wherein the same corresponding positions of the k sets of memory planes are simultaneously accessed and the resultant data calculated by the multi-plane bit operation unit are also simultaneously written thereto.

BRIEF DESCRIPTION OF THE DRAWINGS

FIG. 11 illustrates the content of the data stored in the fourth register (4R) shown FIG. 7.

DESCRIPTION OF THE PREFERRED EMBODIMENTS

Figure 1:
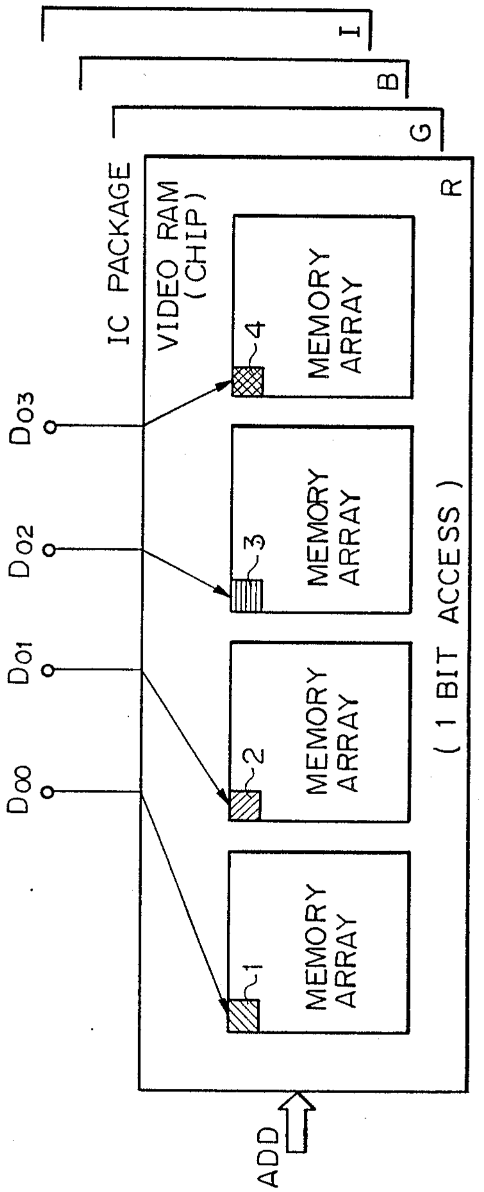
Fig. 1 PRIOR ART
FIG. 1 is a schematic view of a conventional video RAM for explaining a conventional access method.

Before describing the preferred embodiments, an explanation will by given of a conventional video RAM structure. FIG.1 illustrates a schematic video RAM structure typically housed in IC package. The video RAM includes four memory array blocks each having a corresponding color memory plane. That is, for example, the memory chip (R) comprises the four red (R) memory planes for storing the red information. Similarly, the memory chip (G) comprises the four green (G) memory planes and the memory chip (B) comprises the four blue memory planes. Further, the memory chip (I) comprises the four intensity memory planes used for adjusting the intensity of a pixel.

The color signals are input from an external stage to a corresponding memory chip through four terminals of an input/output port (not shown). For example, the R signals $D_{00}$ to $D_{03}$ are input to the four bit areas 1 to 4 of the memory chip (R) based on an address ADD destinated by the external stage. Similarly, the G signals are input to the four bit areas 1 to 4 of the memory chip (G), the B signals to the four bit areas 1 to 4 and the I signal to the four bit areas 1 to 4. The color of the pixel is determined based on these sixteen signals accessed by the address signal ADD on the display apparatus for example, CRT displayer. When the color of next pixel is determined, the same access is repeated so that the display speed becomes slow.

Therefore, the color display speed at the CRT is relatively slow, particularly, when displaying the same color at a predetermined area of the CRT.

The structure of the conventional multi-plane video RAM having dual ports and the problems thereof will be explained in detail hereinafter with reference to FIGS. 2, 3, and 4.

Figure 2:
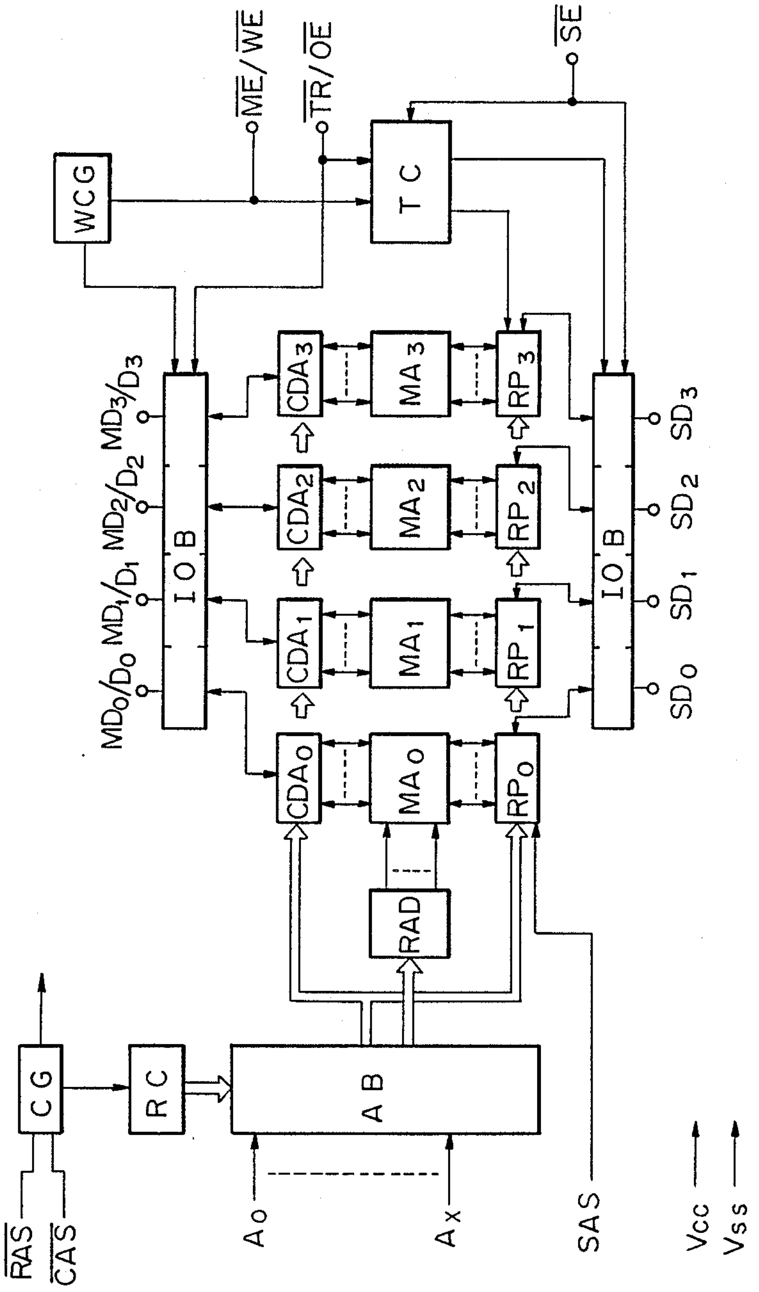
Fig. 2 PRIOR ART
FIGS. 2 and 3 are schematic block diagrams of a conventional video RAM structure.
Figure 3:
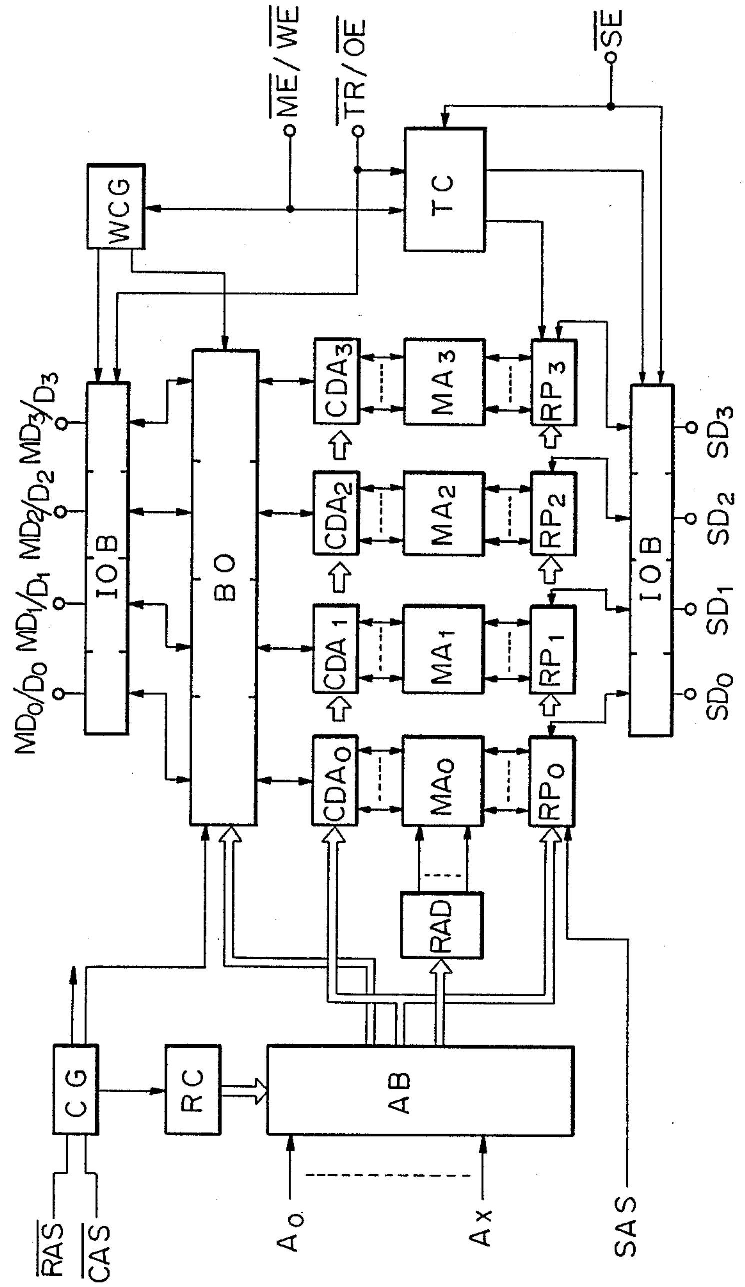
Fig. 3 PRIOR ART

In FIGS. 2 and 3, CG represents a clock generator, RC a refresh control unit, AB an address buffer, IOB an input/output buffer, BO a bit operation unit, CDAx a column decoder amplifier, RAD a row address decoder, MAx a memory array, RPx a register pointer, WCG a write clock generator, TC a transfer control unit, RAS a row address strobe signal, CAS a column address strobe signal, Ax an address signal, SAS a serial access memory strobe signal, MDx/Dx a mask data/-parallel input output data singal, SDx a series input output data signal, ME/WE a mask enable/write enable signal, TR/OE a transfer enable/output enable signal, and SE a serial enable signal.

In FIG. 2, the video RAM is divided into four memory array blocks $MA_0$ to $MA_3$ and each of the blocks $MA_0$ to $MA_3$ has an input/output terminal MDx/Dx (below, x=0 to 3) for parallel access and the input/output terminal SDx (x=0 to 3) for series access. When accessing the memory array in parallel, mask data is input to the buffer IOB through the terminal MDx/Dx in response to the various control signals RAS, CAS, ME/WE, TR/OE and the address signal Ax. Also, the write data is input from the terminal MDx/Dx and the data Dx is written to the memory array MAx. When accessing is in series, the stored data is read out from the memory array MAx to the pointer RPx in response to the above control and address signals and the read data is serially output from the buffer IOB to the terminal SDx in response to the strobe signal SAS.

In FIG. 3, BO represents a bit operation unit. The unit BO is added to the structure shown in FIG. 2 and is provided to determine the content of calculated data based on the data previously input from the address terminal Ax and to perform a logic calculation with the data input from the external stage through the terminal MDx/Dx. The resultant data is written to the memory array MAx.

Figure 4:
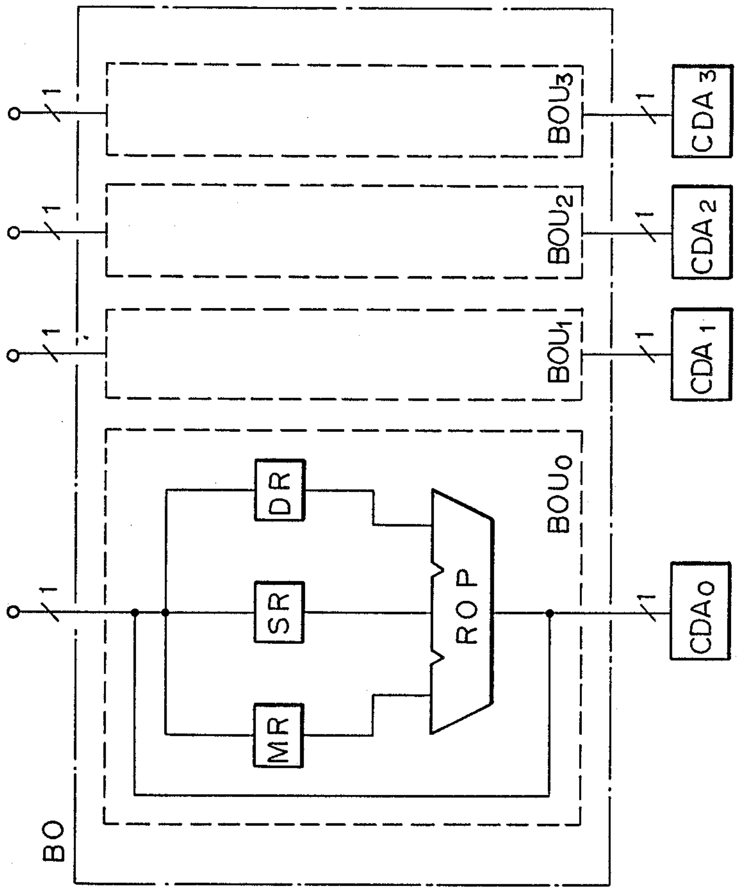
Fig. 4 PRIOR ART
FIG. 4 is a detailed block diagram of the bit operation unit (BO) shown in FIG. 3.

In FIG. 4, the bit operation unit BO shown in FIG. 3 comprises four blocks $BOU_0$ to $BOU_3$ each having the same structure. Each block comprises a mask register MR for storing the mask data, a source register SR for storing the source data, a destination register DR for storing the destination data and a raster operation block ROP for performing the logic calculation based on the source data and destination data corresponding to the mask data. Resultant data calculated by the block ROP is output to the column decoder amplifier $CDA_0$. In this case, each block is accessed for each bit as shown by "1".

In these conventional video RAM structures, the memory array units are arranged in a two dimensional structure. Therefore, when a three dimensional stucture is required for displaying the color image, it is necessary to independently provide the memory array in parallel.

Accordingly, it is necessary to access each memory array many times in order to obtain the required color pixel when displaying on a CRT displayer.

Further, since the number of terminals can not be increased in relation to the space factor, the IC package is limited, and thus the number of data to be written is also limited.

A multi-plane video RAM according to an embodiment of the present invention will be explained in detail hereinafter.

Figure 5:
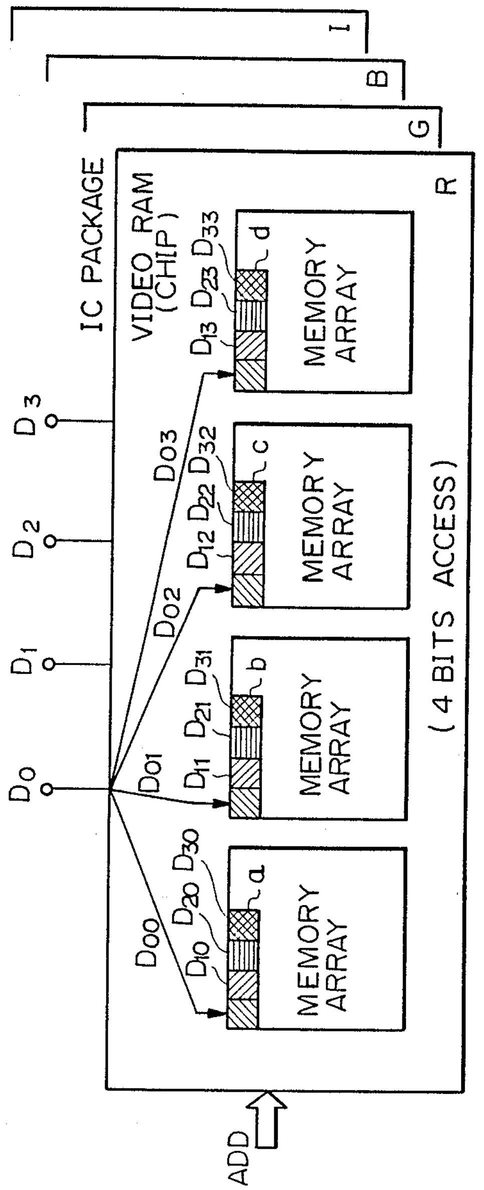
FIG. 5 is a schematic view of a multi-plane video RAM for explaining a three-dimensional access method according to the present invention.

FIG. 5 is a schematic view of a multi-plane video RAM structure for briefly explaining an access method of the present invention. The video RAM includes four memory array blocks each having the same structure. Each memory array comprises the same memory plane each having four bit areas a to d enabling a read/write operation with only one access. That is, each of the bit areas a to d comprises four pixed data of the R signal. The signal $D_0$ is simultaneously input to all areas $D_{00}$ to $D_{03}$. Similarly, the signal $D_1$ is simultaneously input to all areas $D_{10}$ to $D_{13}$, the signal $D_2$ to all areas $D_{20}$ to $D_{23}$ and the signal $D_3$ to all areas $D_{30}$ to $D_{33}$, in each memory array. In this structure, since four pixel data can be read or written by one access, the color display speed is considerably improved, particularly when displaying the same color to a predetermined area on the CRT.

Figure 6:
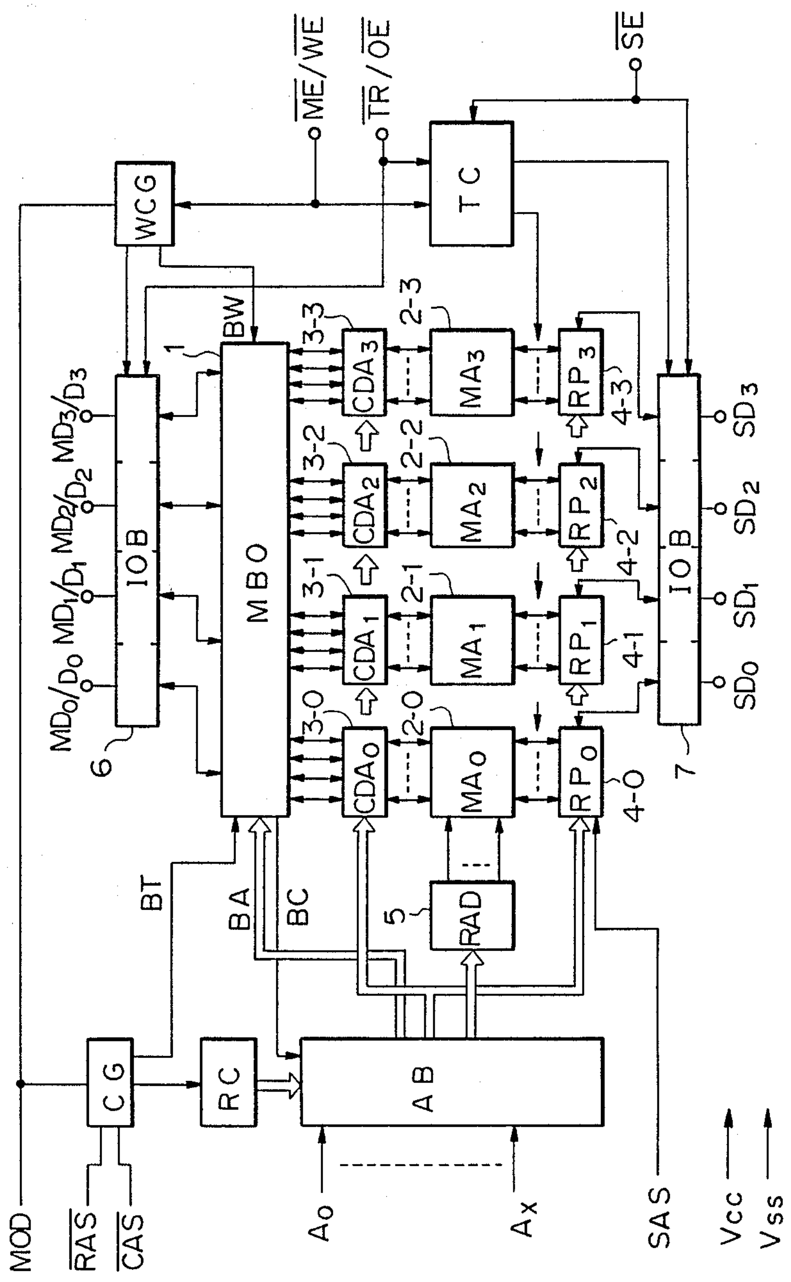
FIG. 6 is a schematic block diagram of a multi-plane video RAM according to an embodiment of the present invention.

In FIG. 6, MBO represents a memory plane bit operation unit for performing a logic calculation corresponding to the input data from the external stage based on a predetermined rule corresponding to the input information applied from the external stage. Each memory array $MA_0$ to $MA_3$ comprises four (k=4) sets of memory planes, each of which comprises a one bit structure including m (rows)×n (columns). The same corresponding position of each of the four memory planes can be simultaneously accessed by one access operation.

The column decoder amplifiers $CDA_0$ to $CDA_3$ are provided for decoding the column address and accessing the memory planes $MA_0$ to $MA_3$.

The register pointers $RP_0$ to $RP_3$ are provided for converting the parallel data read out from the memory planes $MA_0$ to $MA_3$ to serial data and outputting serial data from the input/output buffer IOB.

The basic operation of this circuit will be explained briefly hereinafter. The mask data MDx is input from the input/output terminal for parallel access MDx/Dx to the unit MBO through the buffer IOB, then the mask data MDx is held in the unit MBO. Further, the image data Dx to be displayed is input from the terminal MDx/Dx to the unit MBO through the buffer IOB. The unit MBO performs the calculation for the rule corresponding to the input mask data MDx with the input data Dx and the resultant data are simultaneously written to the position having the same address in the memory array $MA_0$ to $MA_3$, each having k sets of the memory planes. In this case, as can be understood, each memory array comprises k set of the memory planes each having an m (rows)×n (columns) area.

Figure 7:
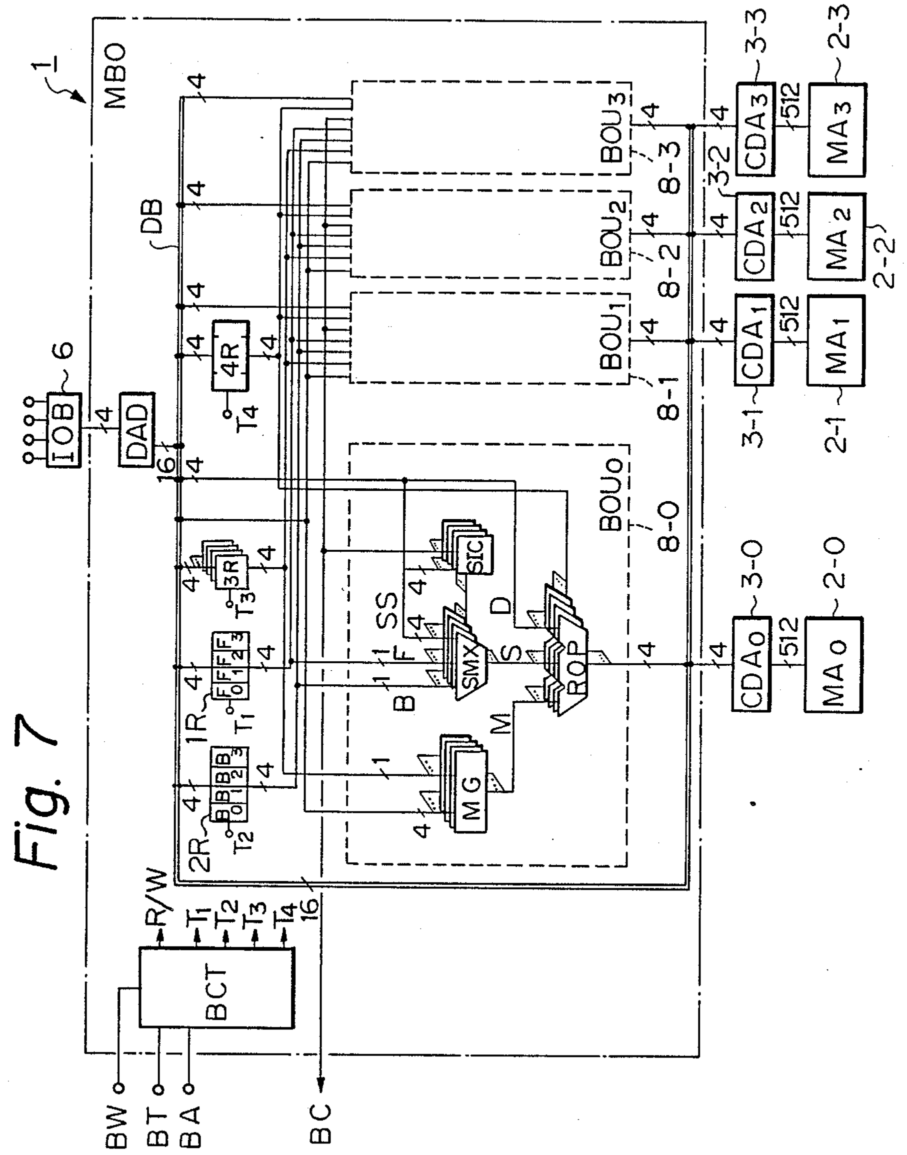
FIG. 7 is a detailed circuit diagram of the memory plane bit operation unit (MBO) shown in FIG. 6.

In FIG. 7, the multi-plane bit operation unit MBO comprises a data concentration/distribution unit DAD, a bit operation controller BCT, and four bit operation blocks $BOU_0$ to $BOU_3$. Each of the blocks $BOU_0$ to $BOU_3$ has the same structure and comprises a mask data generator MG, a source data multiplexer SMX, an SMX input data controller SIC, and a raster operation block ROP. The bit operation block BOU performs a logic operation based on the rule corresponding to the input mask data MDx from the external stage with the input data Dx from the external stage, and the resultant data are written to the memory planes in arrays $MA_0$ to $MA_3$ through the decoder amplifiers $CDA_0$ to $CDA_3$.

1R to 4R represent registers for holding the various information. The unit DAD is provided for concentrating and distributing the data as explained with reference to FIG. 8. The controller BCT is provided for generating the various timing signals $T_1$ to $T_4$ to control the operation of the bit operation blocks $BOU_0$ to $BOU_3$ as explained with reference to FIG. 11.

An explanation will be given of the calculation of the logic operation based on the rule corresponding to the input mask data MDx from the buffer IOB.

[First Step]

Referring to FIG. 6, the mode, terminal MOD is set to the register mode RM. The strobe signals $\overline{RAS}$ and $\overline{CAS}$ are input to the clock generator CG. The generator CG generates a bit timing signal BT and this signal BT is input to the controller BCT in the unit MBO (FIG. 7). The mask enable/write enable signal ME/WE is input to the buffer IOB through the write clock generator WCG. The transfer enable/output enable signal TR/OE is input to the buffer IOB. The address signal Ax is input to the address buffer AB and the buffer AB generates a bit address signal BA. The address signal BA is input to the controller BCT and the register pointer PRx. The data Dx, shown in FIG. 7, is set to the registers 1R to 4R based on the timing signals $T_1$ to $T_4$ through the buffer IOB and the unit DAD. In this case, the first register IR stores the date Fx for the multiplexer SMX. The second register 2R stores the data Bx also for the multiplexer SMX. The third register 3R stores the mask data MDx for the mask data generator MG. The fourth register 4R stores the calculation data for the raster operation block ROP. For example, when a dotted-line is displayed on the CRT, the fourth register 4R stores the data "1010" as shown in FIG. 11.

[Second Step]

The mask data MDx is input to the mask generator MG through the buffer IOB and the unit DAD. The data stored in the register 3R is read out and, further, input to the mask generator MG. The mask generator MG performs the OR logic calculation regarding both mask data, and the resultant data is applied to the block ROP. The logic calculation of the corresponding bit is inhibited by this operation.

[Third Step]

The four bit data Dx (below, line data) is input to the input data controller SIC. The controller SIC outputs the data Dx to the selection terminal of the multiplexer SMX. The multiplexer SMX selects one of the three bits of data of the Fx data from the register 1R, the one bit data Bx from the register 2R, and the line data Dx from the external stage based on the selection signal from the multiplexer SMX. The data selected by the multiplexer SMX is input to the block ROP. For example, when the line data Dx "1101" is input from the external stage, the line data Dx "1101" is input to the selection terminal of the multiplexer SMX through the controller SIC. The multiplexer SMX outputs source data S "Fx, Fx, Bx, Fx" to the block ROP. In this case, the source data S "$F_0$, $F_0$, $B_0$, $F_0$" is input to the block ROP in the bit operation block $BOU_0$, the source data S "$F_1$, $F_1$, $B_1$, $F_1$" is input to the block ROP in the block $BOU_1$. Similarly, the source data S "$F_2$, $F_2$, $B_2$, $F_2$" is input to the $BOU_2$ and the source data S "$F_3$, $F_3$, $B_3$, $F_3$" to the $BOU_3$.

[Fourth Step]

The source data S "Fx, Fx, Bx, Fx" from the multiplexer SMX and the destination data Dx from the memory plane MAx are input to the block ROP. Since the fourth register 4R stores the calculation information "1010", (representing a dotted line in this example), the source data Sx is output from the block ROP for the non-inhibited bit by the input mask data M from the generator MG. The block ROP outputs the destination data Dx for the inhibited bit. Based on the above operation, only the non-inhibited data identified by the mask data M is replaced by the source data Sx, and then the desired line can be displayed at the CRT.

[Fifth Step]

The data output from the block ROP are written to the memory plane MAx through the decoder amplifier CDAx.

Figure 8:
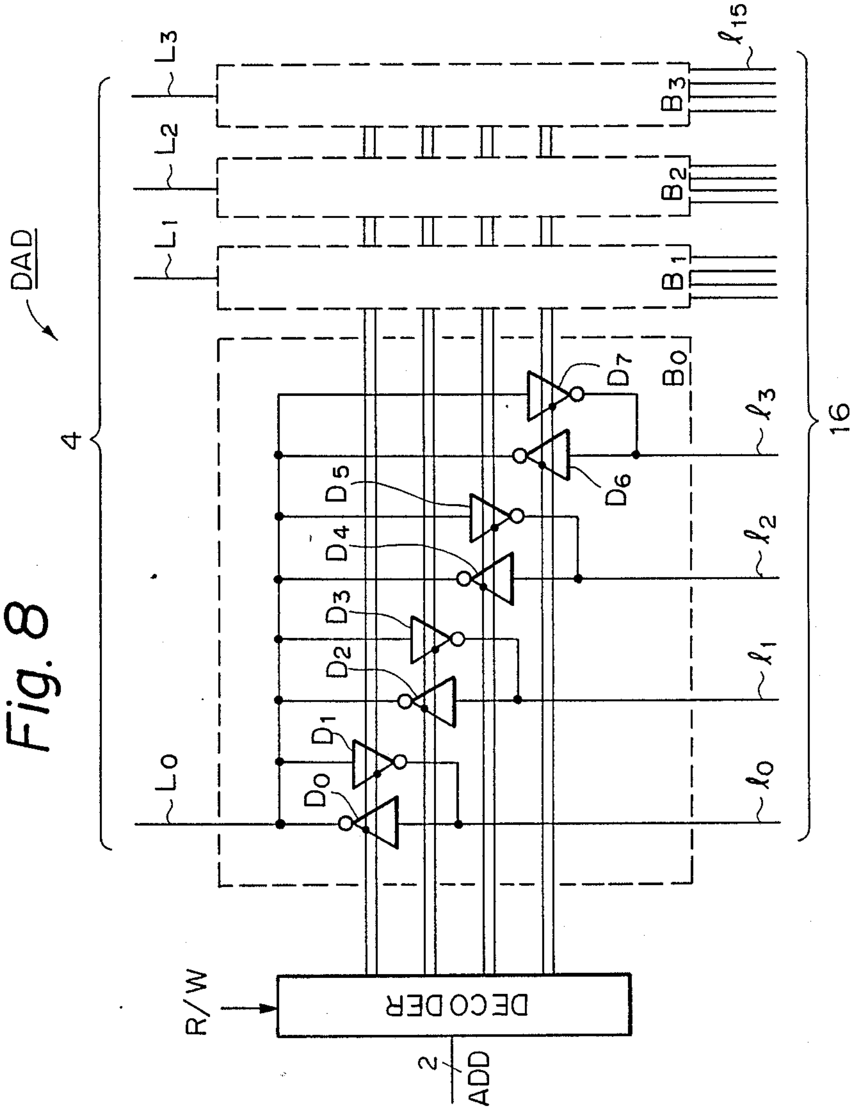
FIG. 8 is a detailed circuit diagram of the data concentration/distribution unit (DAD) shown in FIG. 7.

In FIG. 8, the data concentration/distribution unit DAD comprises four data concentration/distribution blocks $B_0$ to $B_3$, each have the same structure. Each block comprises eight drives $D_0$ to $D_7$. The lines $L_0$ to $L_3$ are connected to the buffer IOB. One bit line $L_0$ is distributed to four bit lines $l_0$ to $l_3$ through the drivers $D_0$ to $D_7$. The sixteen output lines $l_0$ to $l_{15}$ are connected to the data bus line DB shown in FIG. 7. Each driver comprises, for example, a tri-state element, that is controlled by the read/write signal R/W from the bit operation controller BCT through the decoder. That is, the input/output operation of the driver is selected by the signal R/W. One line of the four bits lines from the memory array is selected by the two bit decode signal of the address ADD.

Figure 9:
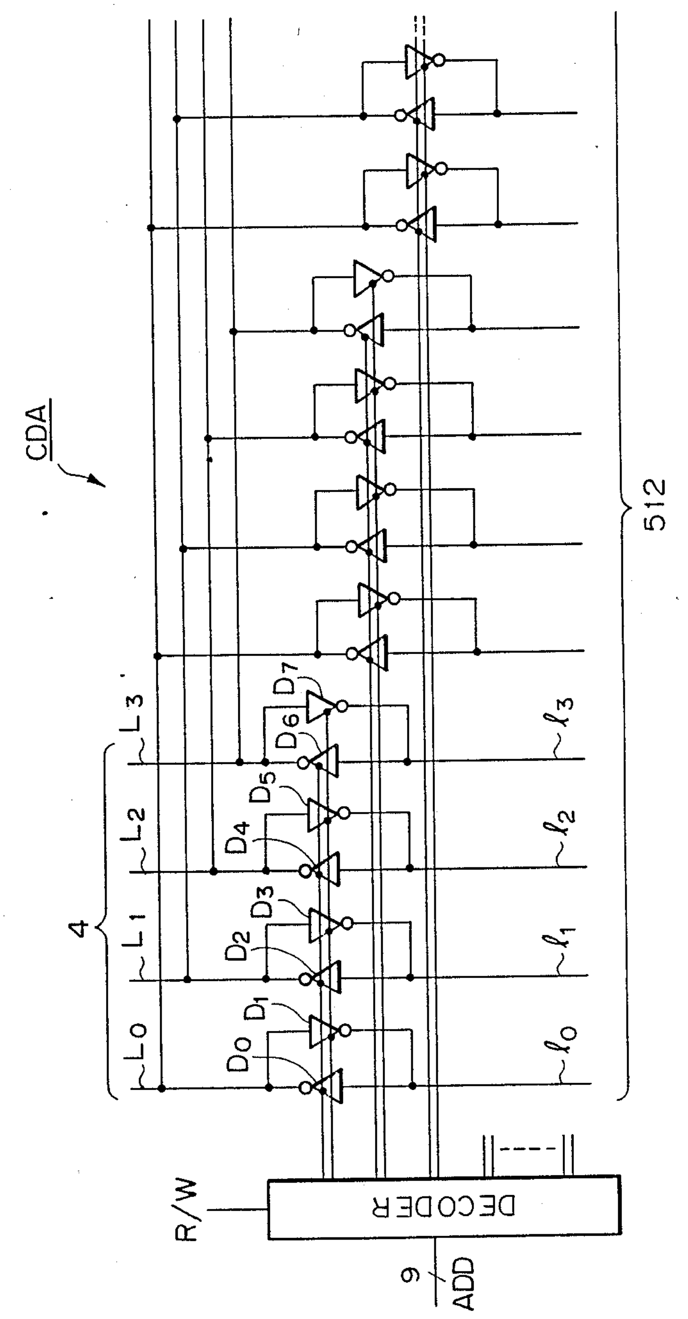
FIG. 9 is a detailed circuit diagram of the column decoder amplifier (CDA) shown in FIG. 6.

FIG. 9, the column decode amplifier CDA comprises a plurality of drivers ($D_0$, $D_1$, $D_2$ . . . ). Four bits lines $L_0$ to $L_3$ are connected to the data bus DB and 512 bits lines ($l_0$, $l_1$, $l_2$ . . . ) are connected to the memory array MAx. The driver is selected by the read/write signal R/W from the bit operation controller BCT. Four of the 512 lines are selected by the seven bit decode signals in the nine bits address ADD.

Figure 10:
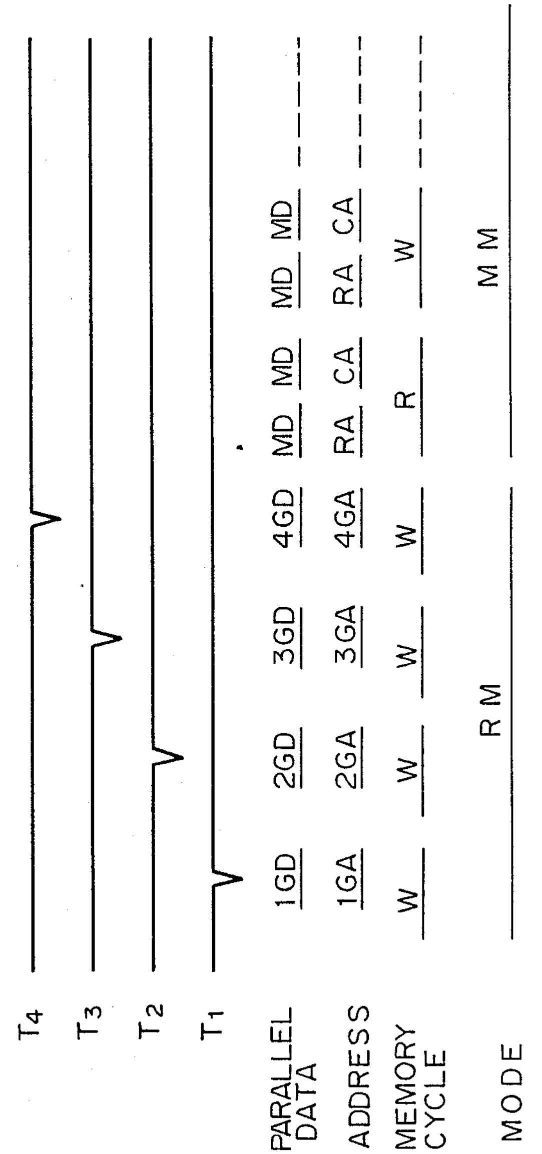
FIG. 10 is a signal timing chart for explaining the operation of the present invention.

In FIG. 10, the timing signals $T_1$ to $T_4$ are output from the bit operation controller BCT. The mode RM corresponds to the procedures described in the above first step. 1GD to 4GD represent the four bits parallel data input from the external stage. 1GA to 4GA represent the address signals and W or R represents memory cycles The parallel data 1GD to 4GD are written to the registers 1R to 4R accessed by the address signal 1GA to 4GA through the buffer IOB and the unit DAD. Each of the memory cycles W corresponds to an access to the register 1R to 4R. The data, the mask data, and the calculation information are set to the resigters 1R to 4R by the above write operation.

The mode MM corresponds to the procedures described in the above second to fifth steps. The logic calculation operations, which are designated by the contents stored in the register 4R, are performed for the source date Sx from the external stage, based on the destination data Dx read out from the memory plane MAx, and the resultant data are written in the corresponding memory plane MAx.

In FIG. 11, the fourth register 4R stores the four bits of data indicated to the left side. These four bits of data are set to the register 4R by the first step. D represents the destination data read out from the memory plane MAx. S represents the source data. Further, $\overline{D}$ and $\overline{S}$ are inverted signals.

Based on the first to fifth steps, the logic calculation operations, which are designated by the contents stored in the register 4R for the non-inhibited bit by the mask data M, are performed for the source data Sx in the block ROP based on the destination data Dx from a memory plane in a memory array MAx. The resultant data is written to the corresponding memory plane of array MAx. In this case, four bit operation blocks $BOU_0$ to $BOU_3$ are provided for enlarging the display area. Further, since the structure having, for example, color information indicated by the depth direction bit (information of $k=4$ bits) is provided in each of the bit operation blocks $BOU_0$ to $BOU_3$, it is possible to achieve a high speed video RAM access by arranging this structure on the same IC chip.

We claim:

1. A multi-plane video RAM for receiving information and displaying a color image on a display apparatus, comprising:

multi-plane bit operation means for calculating and input data based on a predetermined rule corresponding to the received information and for providing resultant data responsive to said calculating, said multi-plane bit operation means including first k bit register means for storing a first portion of the received information and for providing a first portion of the input data based on said first portion of the received information, and second k bit register means for storing a second portion of the received information and for providing a second portion of the input data based on said second portion of the received information;

memory array means, operatively connected to said multi-plane bit operation means, for receiving and storing said resultant data, and said memory array means including three-dimensionally arranged k sets of memory planes, each plane having m (rows)×n (columns); and means for simultaneously accessing corresponding positions of said k sets of memory planes and for writing said resultant data thereto.

2. A multi-plane video RAM as claimed in claim 1, wherein numbers of k and n of said three-dimensionally arranged k sets of memory planes are given by a power of two.

3. A multi-plane video RAM as claimed in claim 1, wherein said multi-plane bit operation means comprises:

third register means, having a k bit length, for enabling data stored in said first and second register means to be written into a selected memory plane, and for maintaining other bits except for said written bits at a previous state.

4. A multi-plane video RAM as claimed in claim 1, wherein said multi-plane bit operation means includes:

means for providing logic calculations with at least some of said received information and with said data stored in said first and second register means, and for writing resultant data from said logic calculation to corresponding position in said memory plane.

* * * * *

UNITED STATES PATENT AND TRADEMARK OFFICE
CERTIFICATE OF CORRECTION

PATENT NO. : 4,933,879

DATED : June 12, 1990

INVENTOR(S) : Hisashige Ando et al.

It is certified that error appears in the above-identified patent and that said Letters Patent is hereby corrected as shown below:

Col. 6, line 53, "and" should be --an--.

Signed and Sealed this

Seventh Day of May, 1991

*Attest:*

HARRY F. MANBECK, JR.

*Attesting Officer*

*Commissioner of Patents and Trademarks*